United States Patent
Yun et al.

(10) Patent No.: US 7,338,183 B2
(45) Date of Patent: Mar. 4, 2008

(54) BACKLIGHT ASSEMBLY AND LCD USING THE SAME

(75) Inventors: Seong Hyun Yun, Choongcheongbuk-do (KR); Yong Yun Kim, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 138 days.

(21) Appl. No.: 11/137,438

(22) Filed: May 26, 2005

(65) Prior Publication Data

US 2005/0265047 A1  Dec. 1, 2005

(30) Foreign Application Priority Data

May 31, 2004  (KR) .................. 10-2004-0038839

(51) Int. Cl.
*F21V 33/00* (2006.01)
(52) U.S. Cl. .................. 362/223; 362/219; 362/225; 362/249
(58) Field of Classification Search .......... 362/560, 362/561, 217, 219, 222–225, 249, 240, 235, 362/236, 260, 237, 244, 246
See application file for complete search history.

(56) References Cited

U.S. PATENT DOCUMENTS

2003/0035283 A1*  2/2003  Lim ........................... 362/97
2003/0227767 A1*  12/2003  Lee et al. .................... 362/23

FOREIGN PATENT DOCUMENTS

| CN | 1467548 | 1/2004 |
| JP | 10-2003-0092004 | 3/2002 |
| KR | 10-2002-0068422 | 8/2002 |

* cited by examiner

*Primary Examiner*—Laura Tso
(74) *Attorney, Agent, or Firm*—McKenna Long & Aldridge LLP (57) ABSTRACT

The backlight assembly includes a plurality of lamps arranged within a predetermined space having divided valid emitting areas, wherein each of the lamps includes two electrodes and one or both of the two electrodes are formed of a transparent metal, a plurality of power terminals, a pair of power terminals arranged in each of divided valid emitting areas, a plurality of lower supporting units arranged in each of the divided valid emitting areas for supporting the plurality of power terminals, and a light diffusion unit arranged above the plurality of lamps.

26 Claims, 11 Drawing Sheets

VALID EMITTING AREA   VALID EMITTING AREA

BACKLIGHT ASSEMBLY AND LCD USING THE SAME

The present invention claims the benefit of Korean Patent Application No. 10-2004-038839 filed in Korea on May 31, 2004, which is hereby incorporated by reference in its entirety.

BACKGROUND OF THE INVENTION

1. Field of the Invention

The present invention relates to a liquid crystal display (LCD) device and more particularly, to a backlight assembly and LCD using the same.

2. Description of the Related Art

A cathode ray tube (CRT) is one of the most commonly used display devices. The CRT has been used as a monitor for various electric devices, such as a television (TV), a meter, a computer and an intelligent terminal. Recently, electronic devices have become lighter and smaller to satisfy user demand. However, there are limitations to the size and the weight of an electronic device having the CRT.

To overcome these limitations, several types of display devices have been recently introduced, such as a liquid crystal display (LCD) device using an electric-field optical effect, a plasma display panel (PDP) using gas discharge and an electro luminescence display (ELD) using electro luminescence. Among these recently introduced display devices, the LCD device has often been used as a substitute to CRT because the LCD device has the advantages of being light, thin, and consumes low power.

In general, a liquid crystal display (LCD) device displays an image by controlling amount of light input from an external light source. Therefore, the LCD device requires an additional light source, such as a backlight assembly, to provide light to a liquid crystal display (LCD) panel. Generally, a backlight assembly can be classified as an edge type or a direct type according to the arrangement of the light emitting lamps.

In the edge type backlight assembly, a lamp unit is arranged at an edge of a light guide panel and light emitted from the lamp unit is guided to the light guide panel for generating planar light through the LCD panel. The direct type backlight assembly is used in a large size display device, which is bigger than 20 inches. In the direct type backlight assembly, a plurality of lamps is arranged in rows and the lamps emit light directly to the entire surface of the LCD panel. The direct type backlight unit assembly is mainly used for large sized LCD devices that require high luminance because the direct type backlight unit provides higher light efficiency compared to the edge type backlight assembly.

Figure 1:
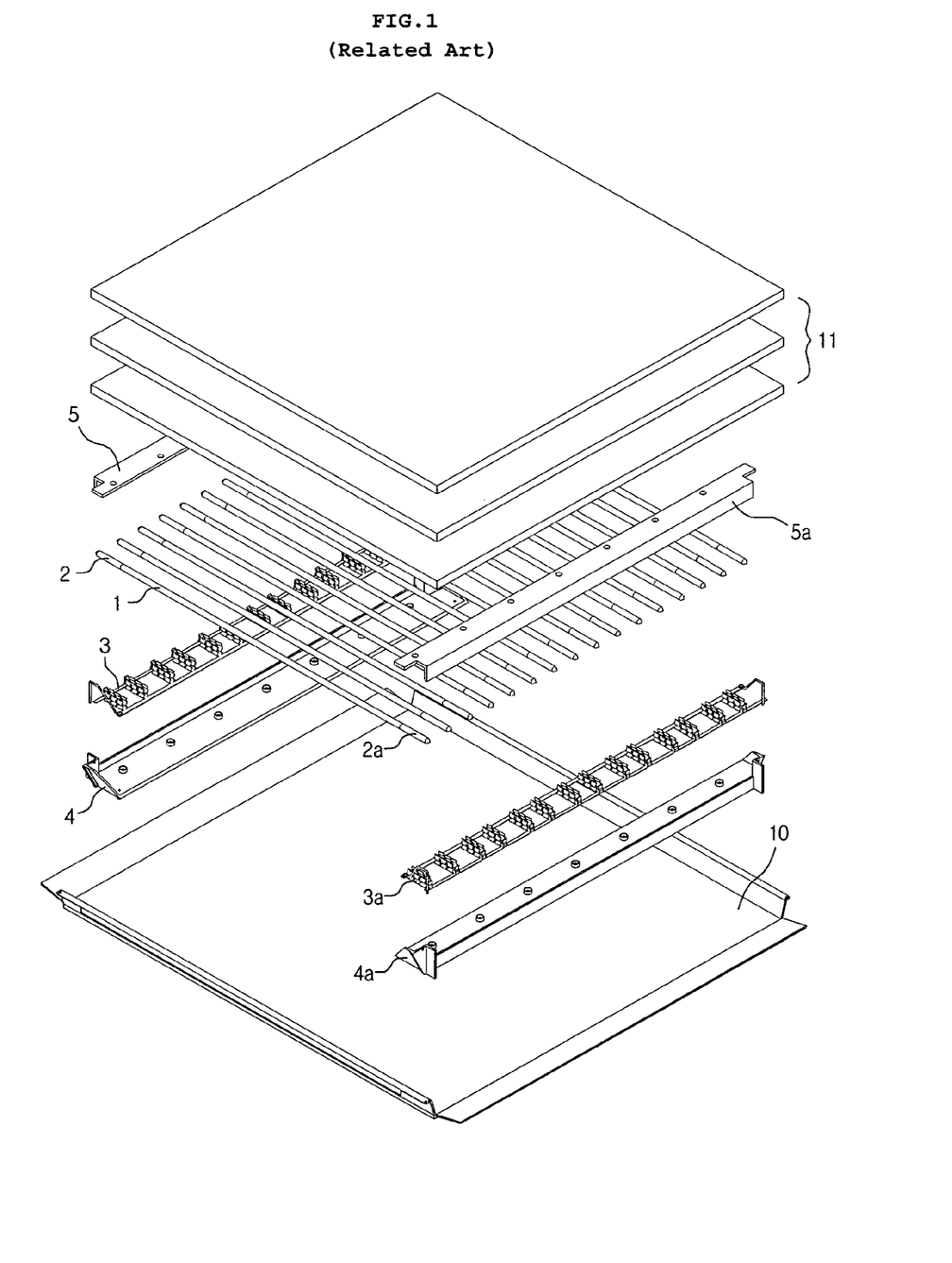
FIG. 1 is an exploded perspective view of a backlight unit in a direct type liquid crystal display device according to the related art.

FIG. 1 is an exploded perspective view of a backlight unit in a direct type liquid crystal display device according to the related art. As shown in FIG. 1, the backlight unit of the direct type liquid crystal display device includes a plurality of lamps 1, a light diffusion unit 11, a first and a second upper supporting units 5 and 5a, a first and a second lower supporting units 4 and 4a, and first and second power terminal units 3 and 3a.

Each of the first and the second power terminal units 3 and 3a includes a plurality of terminals arranged within a predetermined space. Each of the first and the second power terminal units 3 and 3a is connected to the plurality of lamps 1. External electrodes 2 and 2a are mounted at both ends of the lamps 1 and the external electrodes 2 and 2a are connected to the terminals of the first and the second power terminal unit 3 and 3a.

The first and the second power terminal units 3 and 3a receive electric power from an inverter and supply the received electric power to the all lamps 1 connected to the first and the second power terminal units 3 and 3a. The first power terminal 3 and the second power terminal 3a are respectively fixed to the first lower supporting unit 4 and the second lower supporting unit 4a, respectively. Also, the first and the second lower supporting units 4 and 4a are fixed to an internal surface of a back cover 10 of the liquid crystal display device. The internal surface of the back cover 10 is coated with a reflector film (not shown) for reflecting light.

The light diffusion unit 11 includes a plurality of diffusion sheets and diffusion plates. The diffusion sheets and diffusion plates are arranged above the lamps for uniformly diffusing the light emitted from the lamps 1.

Figure 2:
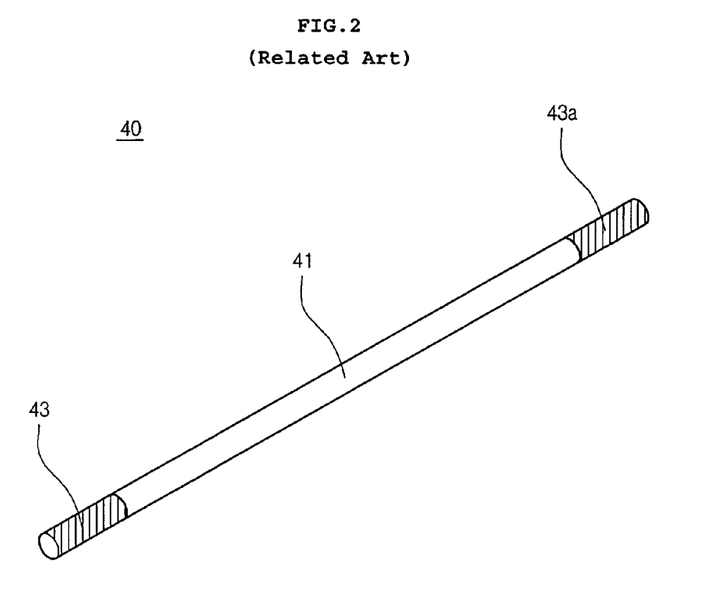
FIG. 2 is a perspective view showing an external electrode fluorescent lamp (EEFL) that is used as a light source of a direct type liquid crystal display device according to the related art.

FIG. 2 is a perspective view showing an external electrode fluorescent lamp (EEFL) that is used as a light source of a direct type liquid crystal display device according to the related art. As shown in FIG. 2, the external electrode fluorescent lamp (EEFL) 40 includes lamp electrode units at both ends of the EEFL 40 like a cold cathode fluorescent lamp (CCFL). The lamp electrode unit (not shown) of the CCFL generally includes an electrode mounted inside ends of a tube, an electrode lead line and a lamp holder for holding the electrode and the electrode lead line. The lamp electrode unit of the EEFL 40 includes external electrodes 43 and 43a externally mounted on both ends of a lamp tube 41 and an insulating layer (not shown) surrounding the external electrodes 43, 43a.

When a liquid crystal display device is assembled, the external electrodes 43 and 43a of the EEFL 40 are manufactured to be exactly matched with and reside within the upper and the lower supporting units which receive the EEFL 40. Accordingly, the external electrodes 43 and 43a of the EEFL 40 are not exposed.

When a length of the EEFL 40 is shorter than 650 mm, the EEFL 40 emits light with uniform brightness across its entire surface. However, if the length of the EEFL 40 is longer than 650 mm, the EEFL 40 emits light with non-uniform brightness because when the length is longer than 650 mm, the EEFL 40 includes a dim area between two light emitting areas.

Figure 3A:
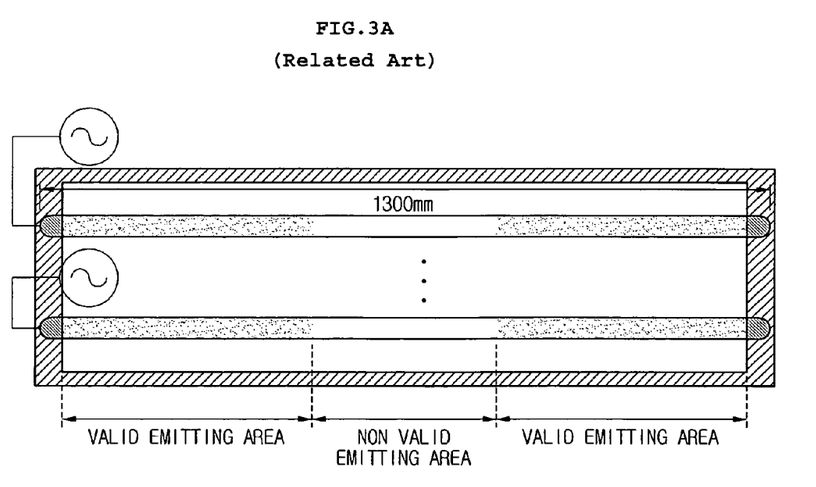
FIG. 3A shows an emitting area and a non-emitting area of an EEFL having 1300 mm of lengthened lamp tube.
Figure 3B:
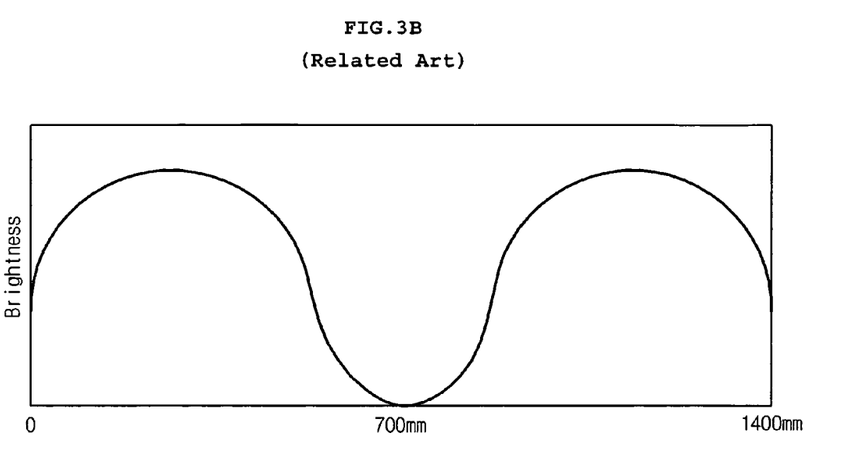
FIG. 3B is a graph showing a brightness distribution of the EEFL shown in FIG. 3A.

FIG. 3A shows uniform light emitting areas and a dim area of an EEFL having a lamp with a 1300 mm length of tube. FIG. 3B is a graph showing a brightness distribution of the EEFL shown in FIG. 3A. To use the EEFL in a large size LCD device bigger than 30 inches, the related art EEFL of a small size LCD device is used by lengthening the lamp tube while maintaining the length of the external electrode. That is, the length of the lamp tube is expanded from 650 mm to 1300 mm. As shown in FIG. 3A, the EEFL with expanded lamp tube includes both emitting areas and a dim area.

Because the external electrode is not lengthened, identical voltage is supplied to the EEFL with expanded lamp tube for emitting light comparing to the same of the related art EEFL. The voltage may be sufficient to uniformly emit light for the related art EEFL which is 650 mm long, but the voltage may be not sufficient for the EEFL having the lengthened lamp tube to uniformly emit light across entire surface of the EEFL. Therefore, in the EEFL with a 1300 mm tube, the dim or non-emitting area is generated. The emitting area and the non-emitting area are simultaneously shown in the graph of FIG. 3B.

As shown in the graph of FIG. 3B, the brightness of a center area of the EEFL is lower than the brightness of edge areas of the EEFL. If high voltage is supplied to the EEFL for overcoming the above mentioned problem, ozone O3 is generated by high voltage supplied to the relatively short external electrode area.

Figure 4A:
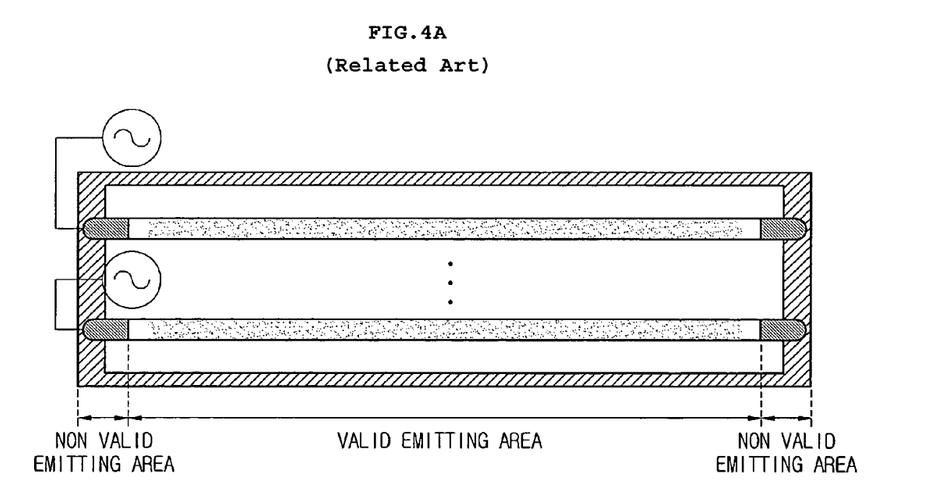
FIG. 4A shows a emitting area and a non-emitting area of an EEFL having lengthened external electrodes and lengthened lamp tube.
Figure 4B:
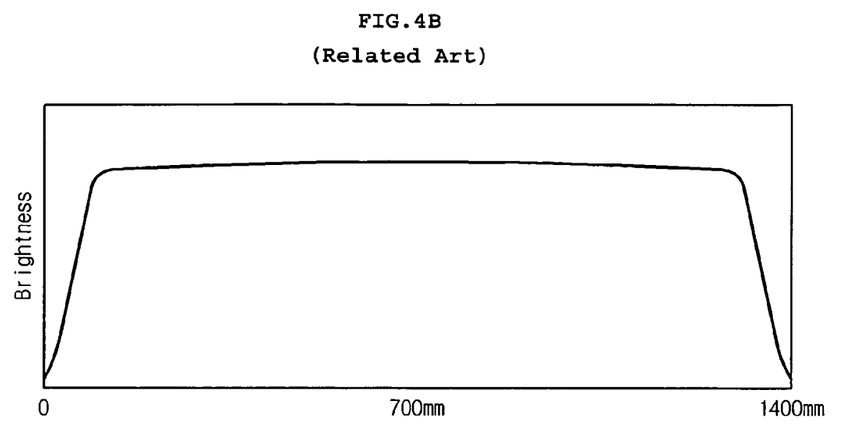
FIG. 4B is a graph showing brightness distribution of the EEFL shown in FIG. 4A.

FIG. 4A shows an emitting area and a non-emitting area of an EEFL having lengthened external electrodes and a lengthened lamp tube. FIG. 4B is a graph showing brightness distribution of the EEFL shown in FIG. 4A. As shown in FIG. 4A, the lamp tube and the external electrode are lengthened for using the EEFL of the small size LCD device in the large size LCD device. In the case of lengthening both the lamp tube and the external electrodes of the EEFL, high voltage can be supplied to the EEFL. However, a portion of the lengthened external electrodes occupies the emitting area. Therefore, the non-emitting area becomes wider and the emitting area becomes narrower.

As shown in FIG. 4B, the lengthened EEFL has uniform brightness but the emitting area becomes narrower. More specifically, when the LCD device is assembled, the external electrodes of the EEFL are matched with the upper supporting unit and the lower supporting unit. If the length of the external electrodes becomes longer, the emitting area of the LCD device becomes narrower.

SUMMARY OF THE INVENTION

Accordingly, the present invention is directed to a backlight assembly that substantially obviates one or more problems due to limitations and disadvantages of the related art.

An object of the present invention is to provide a backlight assembly providing uniform brightness and wider emitting area, and a method for driving thereof, and LCD using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a backlight assembly including a plurality of lamps arranged within a predetermined space having divided valid emitting areas, wherein each of the lamps includes two electrodes and one or both of the two electrodes are formed of a transparent metal, a plurality of power terminals, a pair of power terminals arranged in each of divided valid emitting areas, a plurality of lower supporting units arranged in each of the divided valid emitting areas for supporting the plurality of power terminals, and a light diffusion unit arranged above the plurality of lamps.

In another aspect of the present invention, there is provided a backlight assembly including a plurality of sectored valid emitting areas, which are sectored by dividing a valid emitting area of a liquid crystal display device, and a plurality of light joining units arranged in each of the sectored valid emitting areas.

In another aspect of the present invention, there is provided a liquid crystal display including a liquid crystal panel, a plurality of lamps arranged within a predetermined space on plurality of divided valid emitting areas, wherein each of the lamps includes two electrodes and one or both of the two electrodes are formed of a transparent metal, a plurality of power terminals, a pair of the power terminals arranged in each of divided valid emitting areas, a plurality of lower supporting units arranged in each of the divided valid emitting areas for supporting the plural of power terminals, and a light diffusion unit arranged above the plurality of lamps.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

In embodiments of the present invention, a valid emitting area of a large size liquid crystal display (LCD) device is divided into a plurality of small valid emitting areas, and small size lamps are arranged in the divided small valid emitting areas for providing uniform brightness in a large size LCD device. In one exemplary embodiment of the present invention, the valid emitting area is divided into two small valid emitting areas. However, the present invention can be implemented in embodiments having more than two valid emitting areas.

Figure 5:
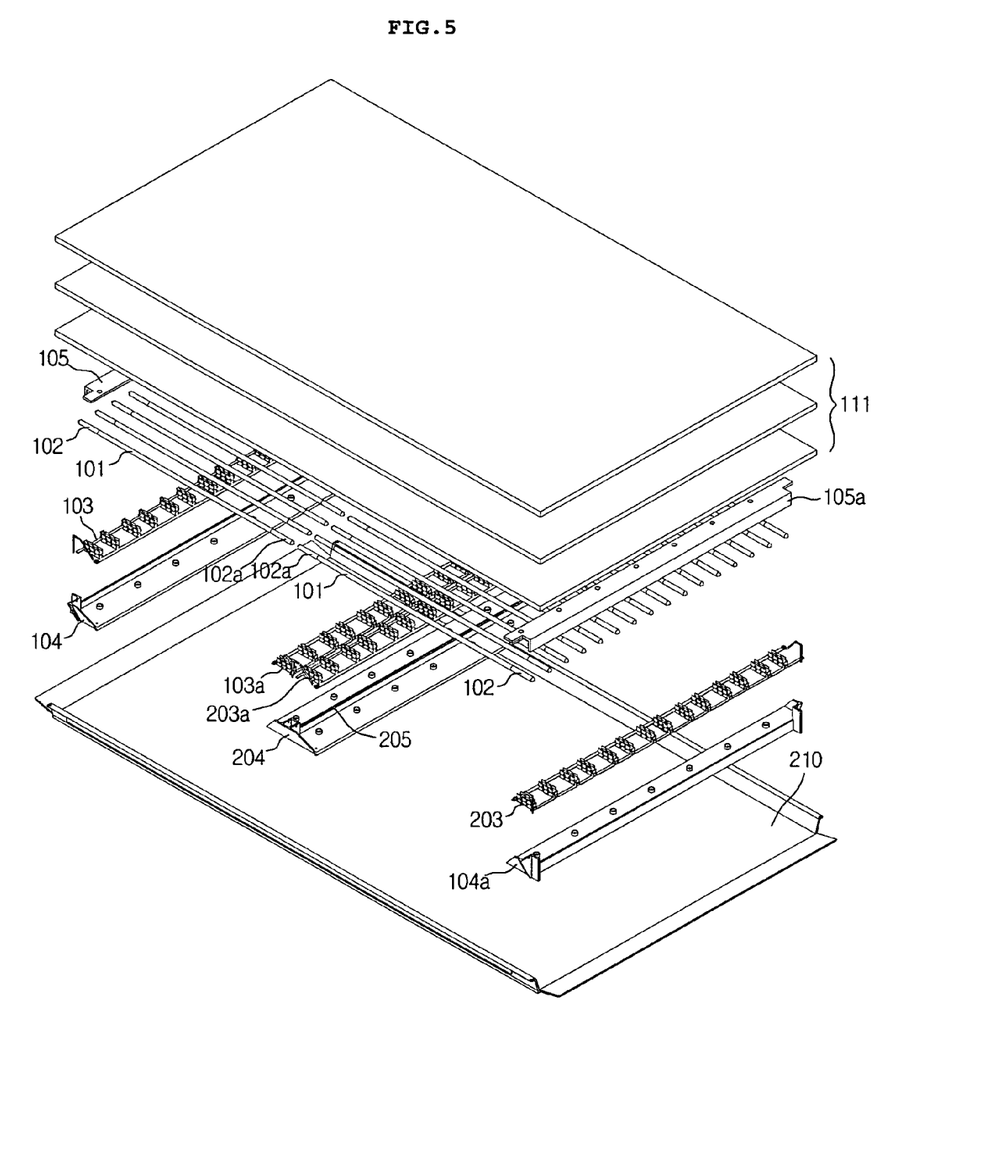
FIG. 5 is an exploded perspective view of a backlight assembly in a direct type liquid crystal display (LCD) device according to an embodiment of the present invention.

FIG. 5 is an exploded perspective view of a backlight assembly in a direct type liquid crystal display (LCD) device according to an embodiment of the present invention. As shown in FIG. 5, a backlight assembly used for a large size LCD device bigger than 32 inches is shown. A valid emitting area of the large size LCD device is divided into two smaller valid emitting areas. The backlight assembly of the present embodiment provides light sources to each of the divided valid emitting areas.

As shown in FIG. 5, the backlight assembly includes a plurality of external electrode fluorescent lamps (EEFL) 101 arranged in each of the two divided valid emitting areas, wherein each of EEFLs is shorter than 650 mm; a first power terminal unit 103 and a second power terminal unit 103a for affixing the EEFLs 101 arranged in one of the divided valid emitting areas; a third power terminal unit 203 and a fourth power terminal unit 203a for affixing EEFLs arranged in the other of the divided valid emitting areas; a first lower supporting unit 104 and a second lower supporting unit 104a for supporting the first power terminal unit 103 and the third power terminal unit 203; and a third lower supporting unit 204 arranged on a boundary area between the two divided valid emitting areas for supporting the second power terminal unit 103a and the forth power terminal unit 203a.

The backlight assembly may further include a first upper supporting unit 105 and a second upper supporting unit 105a which are joined to the first lower supporting unit 140 and the second lower supporting unit 104a. The second and the fourth power terminal units 103a 203a are arranged and fixed to the fourth lower supporting unit 204, which is arranged on the boundary between two divided small valid emitting areas. The second and the fourth power terminal units 103a and 203a are made of a transparent metal which can transmit light.

A light diffusion unit 111 is arranged above the plurality of EEFLs 101. The light diffusion unit 111 includes a plurality of diffusion sheets and diffusion plates. The light diffusion unit 111 uniformly provides light emitted from the EEFLs 101 to a liquid crystal panel.

A reflector film is coated on an internal surface of a back cover 210 connected to the first, the second and the third lower supporting units 104, 104a and 204 for reflecting the light emitted from the plurality of EEFLs 101 to the light diffusion unit 111. A surface of the third lower supporting unit 204 is either coated with a reflector film, since the third lower supporting unit 204 is arranged in the boundary between the two divided valid emitting areas, or the whole part of the third lower supporting unit 204 is made of a transparent insulating material. In the case of coating the reflector film on the third lower supporting unit 204, the light emitted from the EEFL 101 is reflected by the reflector film of the third lower supporting unit 204. In the case of forming the third lower supporting unit 204 with the transparent insulting material, the light is reflected by the reflector film coated on the back cover 210 and the reflected light is propagated through to the light diffusion unit 111.

External electrodes 102 and 102a are mounted at both ends of each EEFL 101. In contrast to the related art, the first external electrode 102 is formed with a non-transparent metal and the second external electrode 102a is formed with a transparent metal. That is, one of external electrodes mounted on both ends of the EEFL 101 is made of a transparent metal. However, both of the first external electrode 102 and the second external electrode 102a may be formed of a transparent metal.

Since the plurality of EEFLs 101 are arranged within a predetermined space within two divided valid emitting areas, the second external electrode 102 formed of a transparent metal must be arranged in the boundary area between the two divided valid emitting areas. Accordingly, the first external electrode 102 of the EEFL 101 is joined to the first power terminal unit 103 or the third power terminal unit 203, which are arranged at outer areas of corresponding valid emitting areas. The second external electrode 102a, which is made of a transparent metal, is joined to the second power terminal unit 103a or the third power terminal unit 203a fixed on the third lower supporting unit 204.

An insulating unit 205 is formed at a center of the third lower supporting unit 204 for electrically insulating closely arranged second external electrodes 102a of the EEFLs 101. That is, the insulating unit 205 prevents the second external electrodes 102a from being shorted by electrically insulating the second power terminal unit 103a and the fourth power terminal unit 203a joined to the third lower supporting unit 204.

In this embodiment of the present invention, since the second external electrode 102a of the EEFL 101, and the second and the fourth power terminals 103a and 203a are made of a transparent metal, brightness is not degraded in the boundary area between the two divided valid emitting areas. Also, the surface of the third lower supporting unit 204 is coated with the reflector film or the third lower supporting unit 204 is made with the transparent insulating resin for preventing degradation of brightness in the boundary area between the two divided valid emitting areas.

In this embodiment of the present invention, degradation of brightness in the boundary area is prevented by using the second external electrode 102a, the second and the fourth power terminal units 103a and 203a which are made with the transparent metal. However, the first and the second external electrodes 102 and 102a, the first and the second power terminal units 103 and 103a and the second and the fourth power terminal units 203 and 203a may all be formed of a transparent metal. Also, the first and the second external electrodes 102 and 102a, the first and the second power terminal units 103 and 103a and the second and the fourth power terminal units 203 and 203a may all be formed of a transparent insulating resin or the reflector film may be coated on the surfaces of the first and the second external electrodes 102 and 102a, the first and the second power terminal units 103 and 103a, and the second and the fourth power terminal units 203 and 203a. If all of the units affixing the EEFLs 101 and power terminal units are made with the transparent material as described above, the valid emitting area of the LCD device can be made even wider because a width of a bezel can be narrowed.

As mentioned above, in embodiments of the present invention, a valid emitting area of a large size LCD device bigger than 32 inches is divided into a plurality of smaller valid emitting areas and short EEFLs are arranged in each of the divided smaller valid emitting areas. Therefore, a wider valid emitting area and a uniform brightness are provided. Furthermore, low voltage can be used the sufficiently operate the EEFLs because short EEFLs are used. Thus, the generation of ozone $O_3$ in the electrode area is prevented.

Dividing a valid emitting area in backlight assembly belonging to a large size liquid crystal display into a plurality of smaller valid emitting areas is explained with reference to the drawing. The valid emitting area is divided because a non-emitting area becomes wider as described in the related art when external electrodes made of opaque metal are lengthened.

In case of forming a first and a second external electrode 102 and 102a of an EEFL 101 by using a transparent metal, EEFLs 101, which are longer than 1400 mm and include the lengthened first and the second external electrode 102 and 102a, can be arranged within a predetermined space instead of dividing the valid emitting area. The transparent metal is ITO or IZO. The external electrode is made of the transparent metal to maintain proper brightness in an electrode area. Therefore, the valid emitting area does not become narrower although the first and the second external electrode 102 and 102a are lengthened. Thus, it is unnecessary to divide the valid emitting area because the valid emitting area does not become narrower even if a length of the EEFL 101 is lengthened. Also, parts such as a power terminal and a lower supporting unit can be eliminated, which are necessary parts when small sizes EEFLs are used since the valid emitting area is divided.

In case of using the EEFL 101 having the external electrodes 102 and 102a made of the transparent metal, power terminals joined to the external electrodes 102 and 102a must be made of the transparent metal. Coating a reflection film on a lower supporting unit or forming the lower supporting unit by using the transparent dielectric material may also be applied to the present embodiment.

Figure 6:
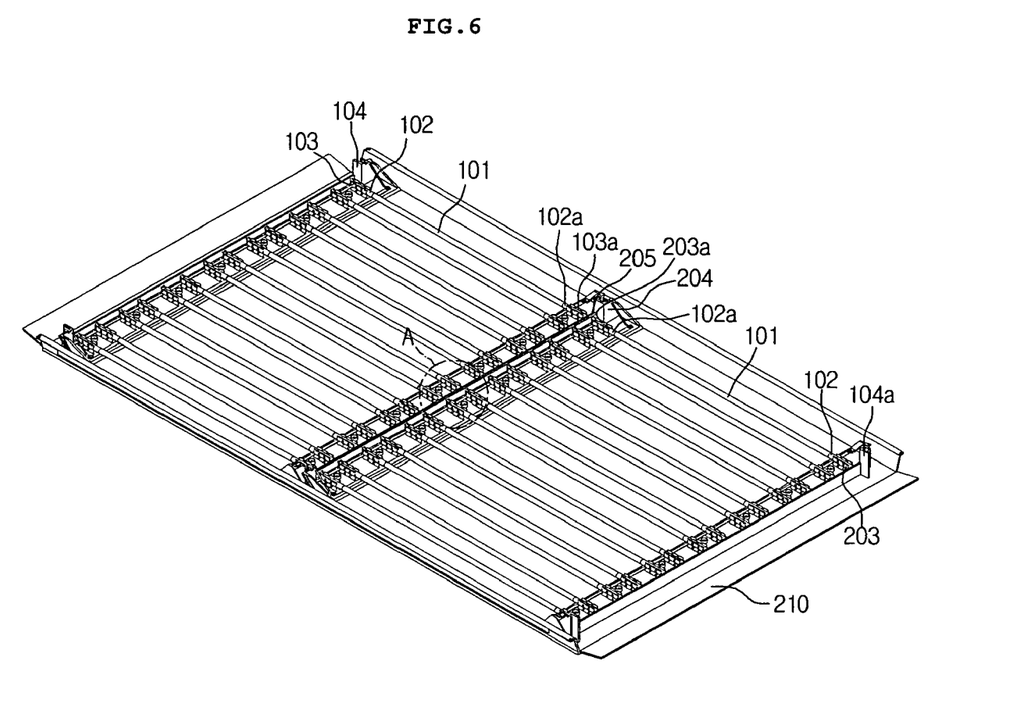
FIG. 6 is a perspective view illustrating a joining structure of a backlight assembly in accordance with an embodiment of the present invention.

FIG. 6 is a perspective view illustrating a joining structure of a backlight assembly in accordance with a preferred embodiment of the present invention. As shown in FIG. 6, the first and the second lower supporting units 104 and 104a are mounted at an inside edge of the back cover 210. The third lower supporting unit 204 is mounted at a center of the back cover 210 where the boundary area between the two divided valid emitting areas is located.

The first and the third power terminal units 103 and 203 are mounted on the first and the second lower supporting unit 104 and 104a. The first and the third power terminal units 103 and 203 receive electric power from an inverter and supply the electric power to the EEFLs 101. The insulating unit 205 is formed at a center of the third lower supporting unit 204. The second and the fourth power terminal units 103a and 203a are separated from each other and arranged at a center of the insulating unit 205. Accordingly, the first power terminal unit 103 and the second power terminal unit 103a are arranged at be in one small valid emitting area and the third and the fourth power terminal unit 203, 203a are arranged at be in another valid emitting area.

The EEFLs 101 are joined to the first, the second, the third and the fourth power terminal units 103, 103a, 203, and 203a. That is, the first external electrodes 102 of the EEFLs 101 are joined to the first and the third power terminal units 103 and 203, and the second external electrodes 102a of the EEFLs 101, which is made of the transparent metal, are joined to the second and the fourth power terminal units 103a and 203a. If all external electrodes are made of the transparent metal, the external electrodes may not be distictly joined to the power terminal units as mentioned above.

That is, in the present embodiment, degradation of brightness in the boundary area between the two divided valid emitting areas is prevented by arranging the external electrodes made of the transparent metal on the second and the fourth power terminal units 103a and 203a, which are arranged at the boundary area between the two divided valid emitting areas. Accordingly, uniform brightness is provided over an entire valid emitting area by arranging short EEFLs 110 in the two divided valid emitting areas when forming electrodes and power terminal units arranged on the boundary between the separated valid emitting areas by using the transparent metal. The transparent metal is ITO or IZO.

As mentioned above, there are various ways to supply electric power to the EEFL 101 when the valid emitting area supplying light to a liquid crystal display device is divided into a plurality of divided emitting areas. First, inverters are arranged in each of the divided emitting areas for orderly turning on EEFLs 101 in a unit of divided emitting areas. In this case, the number of inverters increases since inverters are arranged at a power terminal where a high voltage is applied and another power terminal where a low voltage is applied in every divided emitting areas. However, lighting of the EEFLs 101 may be improved.

Second, two adjacent divided emitting areas are grouped as one unified area among a plurality of divided emitting areas and a common inverter is used for a power terminal in a boundary area. Also, inverters are independently arranged at power terminals in both sides. In this case, two divided emitting areas are simultaneously turned on by the common inverter. Therefore, the number of inverters decreases. This case may be proper to turn on entire divided emitting areas.

Third, one inverter is arranged at all terminals where a high voltage is applied and another inverter is arranged at all terminals where a low voltage is applied for turning on all of the divided emitting areas. In this case, the number of inverters is fixed to two without regard to the number of divided emitting areas. Therefore, a manufacturing cost can be reduced and the liquid crystal device can be lighter.

Figure 7:
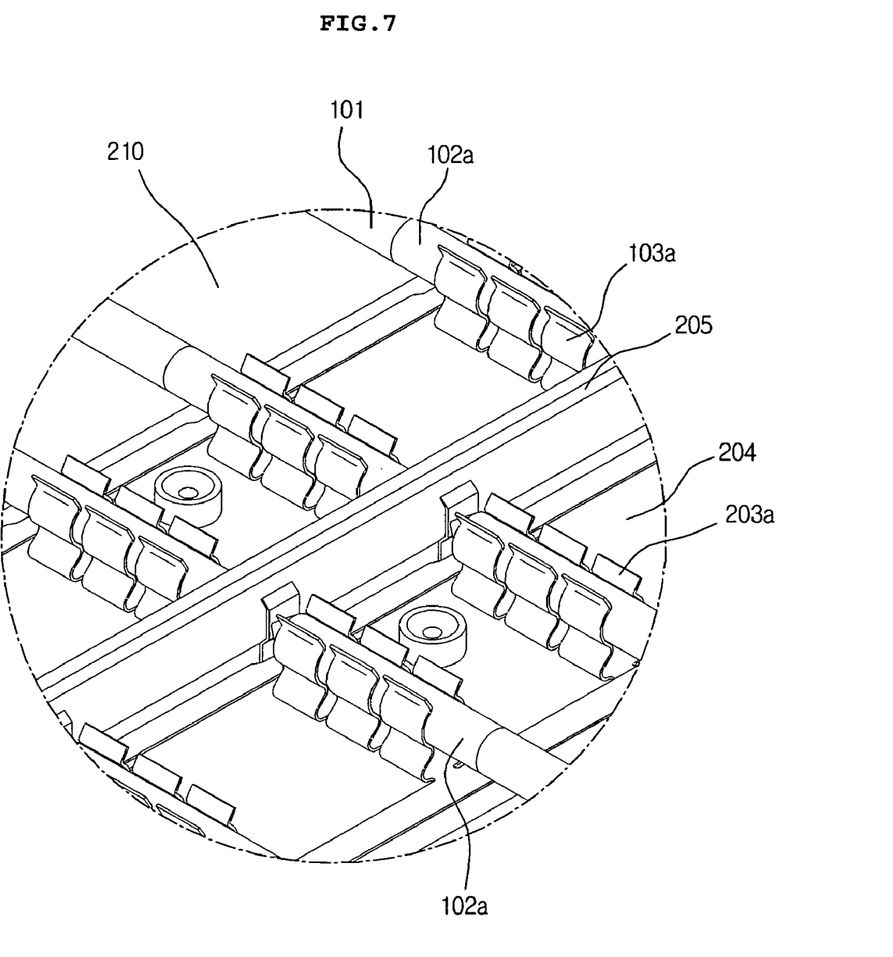
FIG. 7 is a magnified view of portion A in FIG. 6.

FIG. 7 is a magnified view of a portion A in FIG. 6. As shown, the third lower supporting unit 204 is arranged on the boundary area between the two divided valid emitting areas and the second and the fourth power terminal units 103a and 203a are fixed on the third lower supporting unit 204. In the center area of the third lower supporting unit 204, the insulating unit 205 is formed for electrically insulating the second power terminal unit 103a and the fourth power terminal unit 203a. Accordingly, the insulating unit 205 electrically isolates the second external electrodes 102a joined to each of the second power terminal unit 103a and the fourth power terminal unit 203a for preventing the second external electrodes 102a from being shorted.

The light emitted from the EEFL 101 is reflected at the third lower supporting unit 204 because the third lower supporting unit 204 is manufactured with the transparent insulating resin or the surface of the third lower supporting unit 204 is coated with the reflector film. The second and the fourth power terminal units 103a, 203a are fixed on the third lower supporting unit 204 and are made of a transparent metal, such as ITO and IZO. Also, the second external electrodes 102a joined to the second and the fourth power terminals 103a and 203a are made of a transparent metal, such as ITO or IZO, for transmitting the light emitted from the EEFL 101 in both of an up and a down directions without degradation of brightness. Accordingly, brightness is not degraded in the boundary areas although the valid emitting area of large size liquid crystal display device is divided into a plurality of small valid emitting areas and small size EEFLs are arranged in each of the small valid emitting areas. The first and the second lower supporting units may be made of a transparent insulating resin or surfaces of the first and the second lower supporting units my be coated with the reflector film like the third lower supporting unit 204.

Figure 8A:
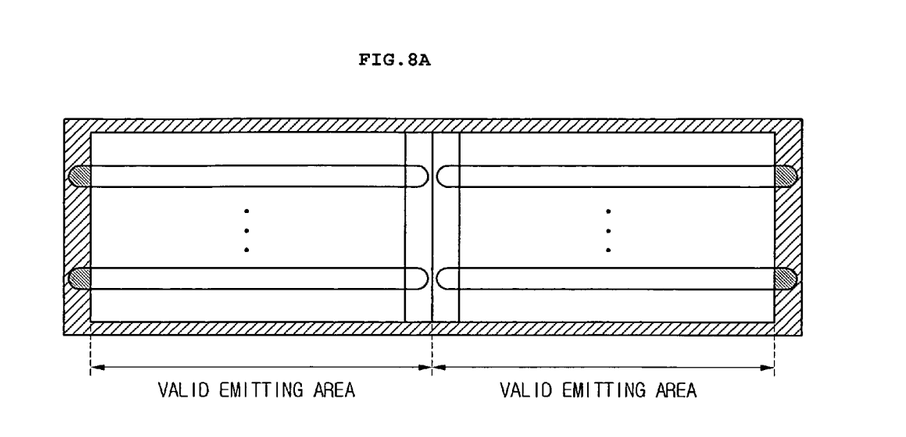
FIG. 8A shows emitting areas of a backlight assembly in accordance with an embodiment of the present invention.
Figure 8B:
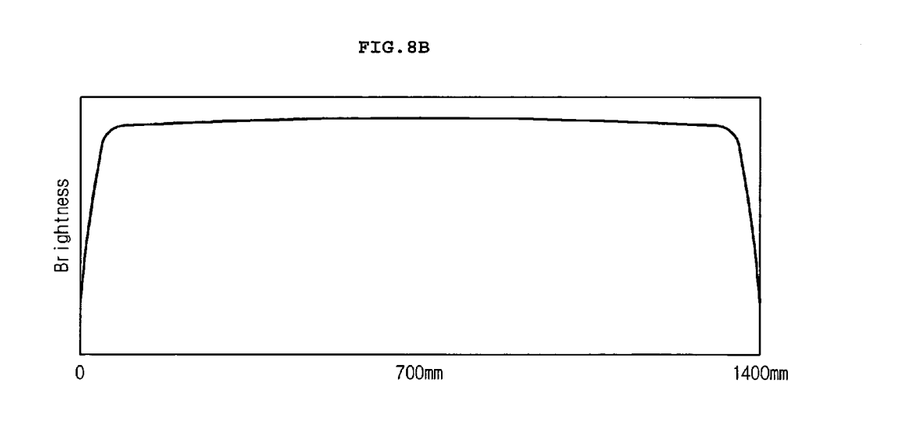
FIG. 8B is a graph showing a brightness distribution of the backlight assembly of FIG. 8A.

FIG. 8A shows valid emitting areas of a backlight assembly in accordance with an embodiment of the present invention and FIG. 8B is a graph showing a brightness distribution of the backlight assembly of FIG. 8A. As shown in FIG. 8A, the valid emitting area of the large size liquid crystal display device bigger than 32 inches is divided into two small valid emitting areas and shorter than 650 mm of EEFLs are arranged in each of divided small valid emitting areas. Since the arranged EEFL is a small size EEFL, a length of the electrodes mounted at both ends of the EEFL is comparatively shorter. Therefore, the valid emitting area becomes wider.

That is, in the present embodiment, a wider valid emitting area is obtained by arranging EEFLs shorter than 650 mm in divided valid emitting areas compared to a valid emitting area provided from the related art backlight assembly using 1300 mm of EEFLs arranged in one large valid emitting area. Furthermore, there is no brightness degradation generated in the boundary area between the small valid emitting areas by forming the external electrodes of the EEFL and the power terminal units with a transparent metal.

A fluorescent substance may be applied on the external electrode made of the transparent metal for obtaining a target color of light emitted from the EEFL. In the case that all external electrodes and the power terminal units are made of a transparent metal, the valid emitting area becomes even more widened because a width of bezel can be reduced.

The graph of FIG. 8B shows that the backlight assembly of an embodiment of the present invention provides uniform brightness in almost entire valid emitting area in the large size liquid crystal display device bigger than 32 inches. Since the length of the external electrodes of the EEFL is comparatively shorter than the related art backlight assembly, a width of the bezel can be narrowed. Therefore, the present embodiment of the invention can provide a wider valid emitting area.

As described above with reference to FIG. 5, since there is no brightness degraded in the lengthened external electrode area in case of using longer than 1400 mm of EEFL having external electrodes formed of the transparent metal, wider valid emitting area can be obtained like arranging smaller EEFLs.

Figure 9A:
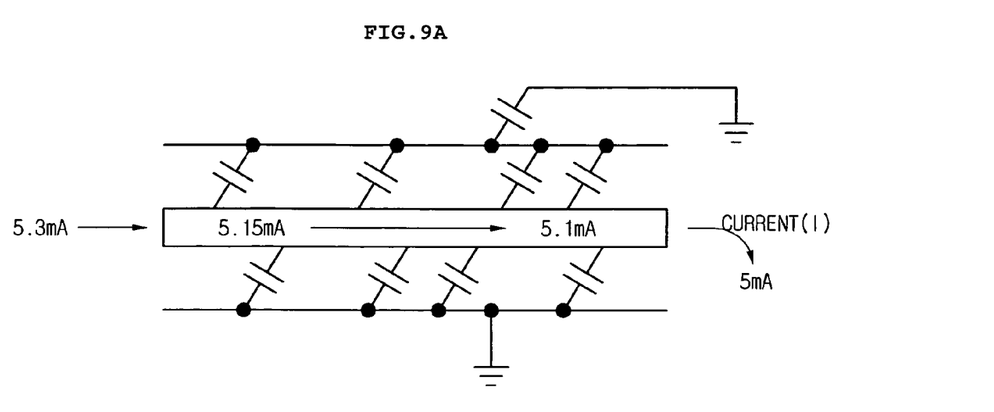
FIGS. 9A and 9B are views for explaining why power consumption is reduced when a small size EEFL is used in accordance with an embodiment of the present invention.
Figure 9B:
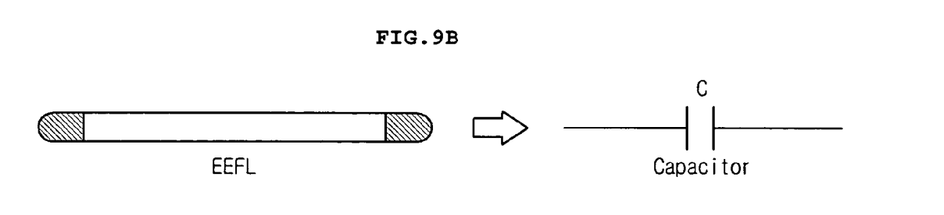

FIGS. 9A and 9B are views for explaining why power consumption is reduced when a small size EEFL is used in accordance with an embodiment of the present invention. As shown in FIG. 9A, when the EEFL is turned on by supplying voltage to the external electrode of the EEFL, a predetermined value of current flows the EEFL. The value of the current is reduced by capacitance formed from the EEFL and units around the EEFL such as the back cover and the light diffusion units. The relation between the supplied voltage and the capacitance is shown in below equation.

$$Q=CV \qquad (Eq. 1)$$

In Eq. 1, Q is quantity of electric charge, C is capacitance between the EEFL and surrounding units, and V is voltage supplied to the EEFL. As shown in Eq. 1, if the capacitance generated between the EEFL and the surrounding units increases, the value of Q also increase although the constant voltage V is supplied to the EEFL. The Q represents a value of leakage current caused by the capacitance formed between the EEFL and the surrounding units. Therefore, the input current and the output current become different as shown in FIG. 9A.

As mentioned above, if a longer EEFL is used, a higher voltage must supply to the EEFL. Accordingly, more current would be leaked and more power is consumed by the EEFL. However, in the present embodiment of the invention, less capacitance is formed between the units and the supplied voltage and amount of current leakage can be reduced because a EEFL shorter than 650 mm is used. That is, since the length of the EEFL is short, a lower capacitance is formed between the surrounding units and the EEFL. In addition, lower voltage can be supplied to the EEFL because the short EEFL can be operated with a lower operating voltage.

As shown in FIG. 9B, the external electrodes formed at both ends of the EEFL is equivalent to a single capacitor. That is, the EEFL is equivalent to the capacitor element. The above mentioned relation can be expressed as following equitation.

$$Q=CV$$

$$C=\epsilon A/d \qquad (Eq. 2)$$

In Eq. 2, Q is quantity of charge in a current flowing in a tube of the EEFL, C is capacitance formed between the external electrodes of the EEFL, V is voltage supplied to the EEFL, $\epsilon$ is a dielectric constant, A is a cross-sectional area of the external electrodes and d is a length of the EEFL.

As shown in Eq. 2, if the distance d between the external electrodes becomes longer, the value of C becomes reduced and the value of Q becomes reduced too. Therefore, the brightness is degraded. Accordingly, if the longer EEFL is used like in the related art, the distance d becomes increased. Therefore, the high voltage V is required for maintaining a target Q value for compensating the low C value. However, in the embodiments of the present invention, a short EEFL is used. Therefore, the value of C does not become smaller and there is no reason to supply high voltage V. Accordingly, light having constant brightness can be obtained without increasing the voltage supplied to the EEFL in the present embodiment of the present invention. Therefore, the backlight assembly of the present embodiment consumes less electric power than the relate art backlight assembly.

Figure 10:
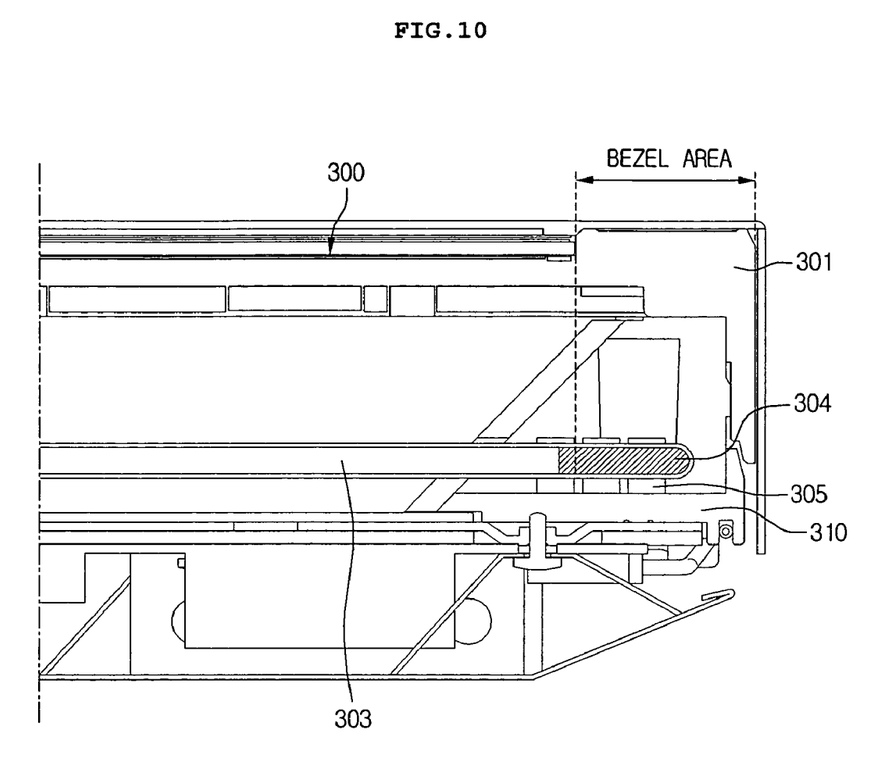
FIGS. 10 and 11 are views for explaining relation between a length of external electrodes of an EEFL and a bezel assembled for preventing light leakage in accordance with an embodiment of the present invention.
Figure 11:
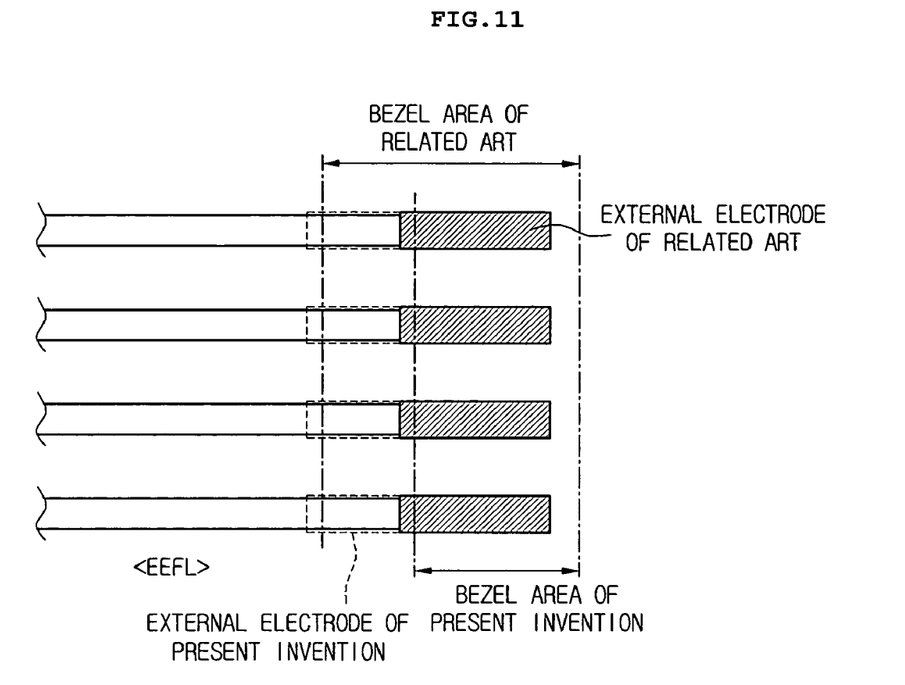

FIGS. 10 and 11 are views for explaining relation between a length of external electrodes of an EEFL and a bezel assembled for preventing light leakage in accordance with a preferred embodiment of the present invention. As shown in FIGS. 10 and 11, a plurality of EEFL 303 is arranged within a predetermined space inside a back cover of a liquid crystal display device and a panel guide 301 of a liquid crystal panel 300 is fixed above the plurality of EEFL 303.

As shown in FIG. 10, the numeral reference 310 represents a back cover and a number reference 305 represents a power terminal. A width of the bezel is controlled according to a width of supporting units joined with the external electrodes 304 of the EEFL 303. In the present embodiment, an EFFL shorter than 650 mm is used instead of using an EFFL longer than 1300 mm in the related art backlight assembly. Therefore, the width of the bezel is reduced from 22.5 mm to 18 mm and accordingly, the valid emitting area becomes widened. That is, as shown in FIG. 11, the bezel area is narrowed by using the shorter EEFL in the present embodiment comparing to the related art using an extended EEFL for the large size liquid crystal display device. As mentioned above, by using the small size EEFL for the large size liquid crystal display device in the embodiments of the present invention, lower voltage is used for operating the EEFL and the width of the bezel is reduced. Therefore, less power is consumed and the valid emitting area is widened.

As described above with reference to FIG. 5, there is no need to extend a bezel area for covering lengthened external electrode area in case of using an EFFL longer than 1400 mm having external electrodes formed of the transparent metal. Therefore, a wider valid emitting area can be obtained since a width of bezel can be narrower like arranging smaller EEFLs having short external electrodes in divided emitting areas. Also, the present embodiment provides uniform brightness characteristic by dividing the valid emitting area of the large size liquid crystal display device into a plurality of small valid emitting areas and arranging small size EEFL into the divided small valid emitting areas. In addition, the present invention provides a wider valid emitting area. Moreover, current leakage is reduced by using the small size EEFLs in embodiments of the present invention, as a result, power consumption is reduced. Because the length of the external electrode of the EEFL used in the large size liquid crystal display device is short, the width of the bezel to be assembled can be reduced. Accordingly, the valid emitting area can be widened.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight assembly, comprising:
    a plurality of lamps arranged within a predetermined space having divided valid emitting areas, wherein each of the lamps includes two electrodes and one or both of the two electrodes are formed of a transparent material;
    a plurality of power terminals, a pair of power terminals arranged in each of divided valid emitting areas;
    a plurality of lower supporting units arranged in each of the divided valid emitting areas for supporting the plurality of power terminals; and
    a light diffusion unit arranged above the plurality of lamps.

2. The backlight assembly according to claim 1, wherein two power terminals arranged in each of adjacent divided valid emitting areas are affixed to the lower supporting unit at a boundary between the divided valid emitting areas.

3. The backlight assembly according to claim 1, wherein an insulating unit is positioned on a center area of a lower supporting unit at a boundary of the divided valid emitting areas for electrically isolating power terminals of adjacent divided valid emitting areas.

4. The backlight assembly according to claim 1, wherein the lower supporting unit arranged at a boundary of the divided valid emitting areas is formed by using a transparent insulating material.

5. The backlight assembly according to claim 2, wherein the electrodes made of the transparent material of the lamps are joined to the two power terminals fixed in the lower supporting unit.

6. The backlight assembly according to claim 2, wherein power terminals fixed to the lower supporting unit are formed of a transparent material.

7. The backlight assembly according to claim 1, wherein the transparent material is indium tin oxide or indium zinc oxide.

8. The backlight assembly according to claim 6, wherein the transparent material is indium tin oxide or indium zinc oxide.

9. The backlight assembly according to claim 1, wherein a reflector film is coated on a surface of a lower supporting unit arranged at a boundary between the divided valid emitting areas.

10. The backlight assembly according to claim 1, wherein the plurality of lamps is a small size EEEL shorter than 650 mm, which is operated by low operating voltage.

11. The backlight assembly according to claim 1, wherein the backlight assembly is joined to a large size liquid crystal display device bigger than 32 inches.

12. The backlight assembly according to claim 1, wherein the plurality of lower supporting units is formed of a transparent insulating material.

13. The backlight assembly according to claim 1, wherein the plurality of power terminals is formed of a transparent material.

14. A liquid crystal display, comprising:
    a liquid crystal panel;
    a plurality of lamps, arranged within a predetermined space on plurality of divided valid emitting areas, wherein each of the lamps includes two electrodes and one or both of the two electrodes are formed of a transparent material;
    a plurality of power terminals, a pair of the power terminals arranged in each of divided valid emitting areas;
    a plurality of lower supporting units arranged in each of the divided valid emitting areas for supporting the plural of power terminals; and
    a light diffusion unit arranged above the plurality of lamps.

15. The liquid crystal display according to claim 14, wherein two power terminals arranged in each of adjacent divided valid emitting areas are fixed at the lower supporting unit arranged at a boundary between the divided valid emitting areas.

16. The liquid crystal display according to claim 14, wherein an insulating unit is formed on a center area of a lower supporting unit at a boundary of the divided valid emitting areas for electrically isolating power terminals of adjacent divided valid emitting areas.

17. The liquid crystal display according to claim 14, wherein the lower supporting unit arranged at the boundary of the divided valid emitting areas is formed of a transparent insulating material.

18. The liquid crystal display according to claim 15, wherein the electrodes made of a transparent material of the lamps are joined with the two power terminals affixed to the lower supporting unit.

19. The liquid crystal display according to claim 15, wherein power terminals affixed to the lower supporting unit are formed of a transparent material.

20. The liquid crystal display according to claim 14, wherein the transparent material is indium tin oxide or indium zinc oxide.

21. The liquid crystal display according to claim 19, wherein the transparent material is indium tin oxide or indium zinc oxide.

22. The liquid crystal display according to claim 14, wherein a reflector film is coated on a surface of a lower supporting unit arranged on a boundary between the divided valid emitting areas.

23. The liquid crystal display according to claim 14, wherein the plurality of lamps is a small size EEFL shorter than 650 mm, which is operated by low operating voltage.

24. The liquid crystal display according to claim 14, wherein the backlight assembly is joined to a large size liquid crystal display device bigger than 32 inches.

25. The liquid crystal display according to claim 14, wherein the plural of lower supporting units is formed of a transparent insulating material.

26. The liquid crystal display according to claim 14, wherein the plural of power terminals is formed of a transparent material.

* * * * *